US007720938B2

(12) United States Patent (10) Patent No.: US 7,720,938 B2
Bowser et al. (45) Date of Patent: *May 18, 2010

(54) TIMELY UPDATE OF INFORMATION DISPLAYED WITHIN A PORTAL

(75) Inventors: Roderick Clint Bowser, Austin, TX (US); John F. LaPenta, Jr., Austin, TX (US); Joseph Laurence Saunders, Austin, TX (US); Ian Wills, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/190,371

(22) Filed: Aug. 12, 2008

(65) Prior Publication Data

US 2008/0294719 A1 Nov. 27, 2008

Related U.S. Application Data

(63) Continuation of application No. 10/793,467, filed on Mar. 4, 2004, now Pat. No. 7,451,194.

(51) Int. Cl.
*G06F 15/16* (2006.01)
(52) U.S. Cl. .................. 709/219; 709/228; 715/205
(58) Field of Classification Search .................. 709/219, 709/225, 246, 227, 202, 217, 228; 715/205
See application file for complete search history.

(56) References Cited

U.S. PATENT DOCUMENTS

| 5,813,007 | A | 9/1998 | Nielsen |
| 5,946,697 | A | 8/1999 | Shen |
| 5,963,964 | A | 10/1999 | Nielsen |
| 6,055,570 | A | 4/2000 | Nielsen |
| 6,061,715 | A | 5/2000 | Hawes |
| 6,094,662 | A | 7/2000 | Hawes |
| 6,507,854 | B1 | 1/2003 | Dunsmoir et al. |
| 6,542,967 | B1 | 4/2003 | Major |
| 6,553,409 | B1 | 4/2003 | Zhang et al. |
| 6,557,076 | B1 | 4/2003 | Copeland et al. |
| 6,591,266 | B1 | 7/2003 | Li et al. |
| 6,738,804 | B1 * | 5/2004 | Lo ............................. 709/219 |
| 7,000,008 | B2 * | 2/2006 | Bautista-Lloyd et al. .... 709/219 |

(Continued)

FOREIGN PATENT DOCUMENTS

GB 2365260 A 2/2002

*Primary Examiner*—Jungwon Chang
(74) *Attorney, Agent, or Firm*—Yee & Associates, P.C.; Jeffrey S. LaBaw

(57) ABSTRACT

A function is added to a Web page that communicates with a refresh control helper. The Web page is associated with a session identifier. If an information update that affects the Web page occur, an update notification is associated with the session identifier. Periodically, the function in the Web page sends the session identifier to the refresh control helper. The refresh control helper calls a refresh controller and passes the session identifier. The refresh controller checks a data store to determine if update notifications associated with the session identifier have been received. If updates are available for the page, the refresh controller informs the refresh control helper that new data is available and removes any update notifications for the session identifier from the data store. The refresh control helper then informs the function in the Web page that new data is available and the function requests a page reload.

20 Claims, 4 Drawing Sheets

U.S. PATENT DOCUMENTS

| | | |
|---|---|---|
| 7,146,563 B2 | 12/2006 | Hesmer et al. |
| 7,171,473 B1 * | 1/2007 | Eftis et al. ................. 709/227 |
| 7,177,918 B2 * | 2/2007 | Joshi et al. ................. 709/219 |
| 7,269,664 B2 * | 9/2007 | Hutsch et al. ............... 709/246 |
| 7,313,588 B1 * | 12/2007 | Shotton et al. .............. 709/202 |
| 7,392,293 B2 * | 6/2008 | Leonik ....................... 709/217 |
| 2002/0036655 A1 | 3/2002 | Yulevich et al. |
| 2002/0052954 A1 * | 5/2002 | Polizzi et al. ............... 709/225 |
| 2002/0069204 A1 | 6/2002 | Kahn et al. |
| 2002/0083051 A1 | 6/2002 | Cornell et al. |
| 2002/0152239 A1 | 10/2002 | Bautista-Lloyd et al. |
| 2002/0157089 A1 | 10/2002 | Patel et al. |
| 2003/0001888 A1 | 1/2003 | Power |
| 2003/0005129 A1 | 1/2003 | Scheinkman |
| 2003/0033382 A1 | 2/2003 | Bogolea et al. |
| 2003/0093476 A1 | 5/2003 | Syed |
| 2003/0177175 A1 | 9/2003 | Worley et al. |
| 2003/0187956 A1 | 10/2003 | Belt et al. |

* cited by examiner

TIMELY UPDATE OF INFORMATION DISPLAYED WITHIN A PORTAL

BACKGROUND OF THE INVENTION

1. Technical Field

The present invention relates to data processing and, in particular, to update of information displayed in Web documents. Still more particularly, the present invention provides a method, apparatus, and program for timely update of information displayed within a portal.

2. Description of Related Art

The use of Web related applications has become more and more prevalent in society, both in business and in everyday personal tasks. For example, many personal Web users begin a Web session with a "portal" page. A portal is a Web "supersite" that provides a variety of services including, for example, Web searching, news, white and yellow pages directories, electronic mail, discussion groups, online shopping, and links to other sites. Although the term was initially used to refer to general purpose sites, the term "portal" may also be used to refer to other sites that offer a plurality of services, particularly those providing dynamic content.

A portal server is a network server that deploys portal services to a public Web site or internal intranet. A portal server may also refer to an application that is used to develop, deliver, and maintain portal services through a Web page. A portal server typically includes a variety of tools and functions, including user authentication, identity management, a search facility, and content aggregation capabilities.

User personalization may also be a feature, which lets people customize their own Web pages. User personalization may be effectuated using "portlets." A portlet is a small window or function that may be used by a portal server to build a portal page. Portlet technology allows a portal page to be customized more quickly either internally by the development team or by the end user. Portlet technology may come as an adjunct to a portal server or as optional interfaces to enterprise resource planning (ERP) applications. The degree of customization also varies. As a typical example, a user may customize a portal page to include a search engine portlet, a stock price portlet, a weather portlet, and a sports scores portlet. However, more application specific examples may also exist. For example, a portal page may provide monitoring services for network resources, where each portlet presents a particular monitor.

When a user requests a portal page through a browser, the portal server dynamically generates the portal page using the various portlets that make up the page. The portal page may include time dependent content, such as stock quote information, weather information, or resource monitoring information. Therefore, a portal page typically includes a function, such as a JavaScript function, for example, that periodically sends a refresh request for the page. However, this function sends refresh requests whether update information is available for the page or not. This results in many unwarranted refresh operations, which creates additional network traffic and causes the portal server to repeatedly recreate the same portal page unnecessarily.

SUMMARY OF THE INVENTION

The present invention recognizes the disadvantages of the prior art and provides a mechanism for timely update of information displayed within a Web page. A function is added to a Web page that communicates with a refresh control helper. The Web page is associated with a session identifier. When information updates occur, information presented in the Web page may change. If an information update that affects the Web page occur, an update notification is associated with the session identifier. Periodically, the function in the Web page sends a session identifier to the refresh control helper. The refresh control helper calls a refresh controller and passes the session identifier. The refresh controller checks a data store to determine if update notifications associated with the session identifier have been received. If no update is available for the session identifier, the refresh controller informs the refresh control helper that no new data is available for the Web page. If updates are available for the page, the refresh controller informs the refresh control helper that new data is available and removes any update notifications for the session identifier from the data store. The refresh control helper then informs the function in the Web page that new data is available and the function requests a page reload.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
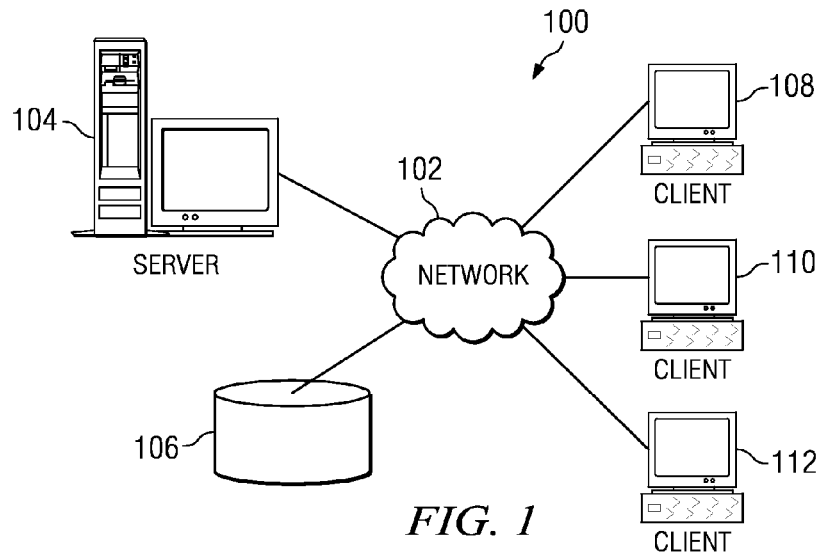
FIG. 1 depicts a pictorial representation of a network of data processing systems in which the present invention may be implemented.
Figure 2:
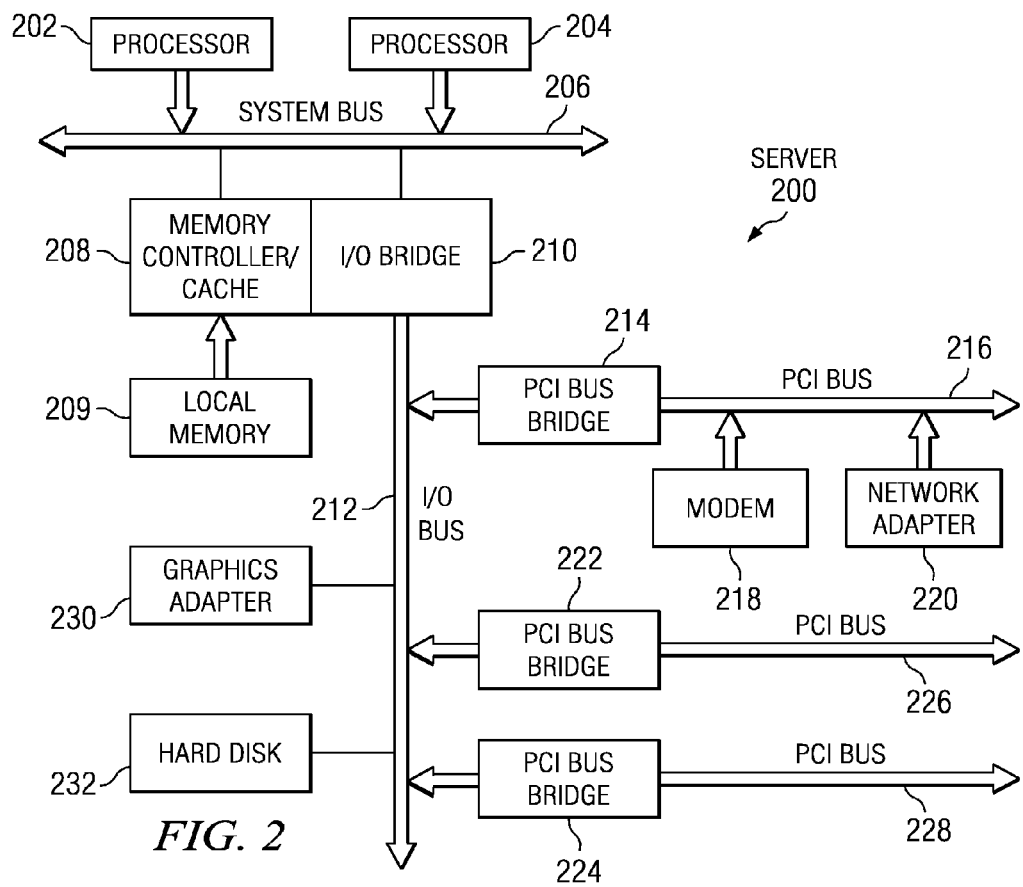
FIG. 2 is a block diagram of a data processing system that may be implemented as a server in accordance with a preferred embodiment of the present invention.
Figure 3:
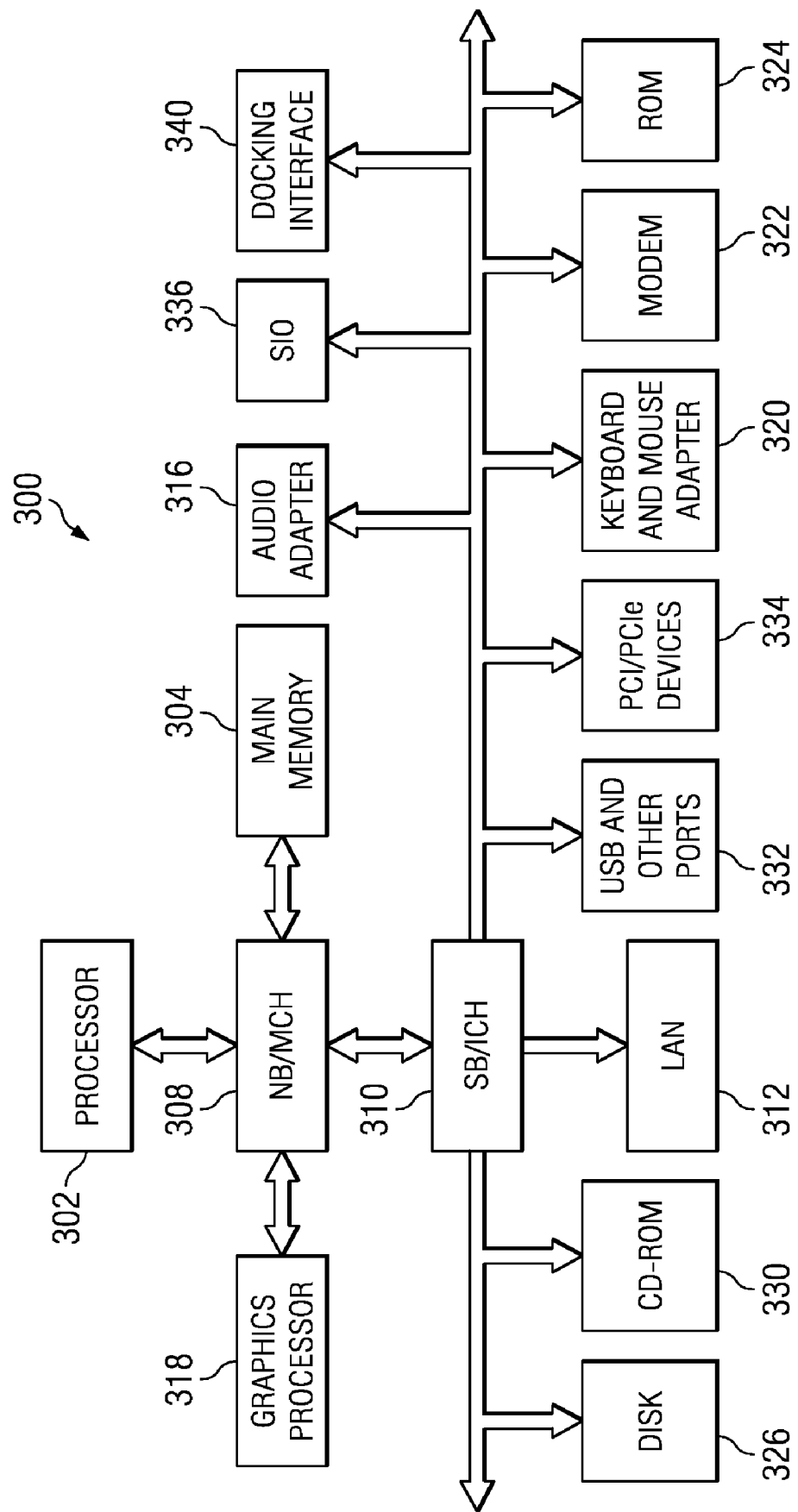
FIG. 3 is a block diagram of a data processing system in which the present invention may be implemented.

The present invention provides a method, apparatus and computer program product for application design based on diagram specialization. The data processing device may be a stand-alone computing device or may be a distributed data processing system in which multiple computing devices are utilized to perform various aspects of the present invention. Therefore, the following FIGS. 1-3 are provided as exemplary diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCT expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (ASP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer or laptop computer in addition to taking the form of a PDA.

In accordance with a preferred embodiment of the present invention, a mechanism for timely update of information displayed within a Web page is provided. When information updates occur, information presented in the Web page may change. The Web page may be, for example, a "portal" page. A portal is a Web "supersite" that provides a variety of services including, for example, Web searching, news, white and yellow pages directories, electronic mail, discussion groups, online shopping, and links to other sites. Although the term was initially used to refer to general purpose sites, the term "portal" may also be used to refer to other sites that offer a plurality of services, particularly those providing dynamic content.

A portal server is a network server that deploys portal services to a public Web site or internal intranet. A portal server may also refer to an application that is used to develop, deliver, and maintain portal services through a Web page. A portal server typically includes a variety of tools and functions, including user authentication, identity management, a search facility, and content aggregation capabilities. A portlet is a small window or function that may be used by a portal server to build a portal page. A portlet is an includable unit of function. In some cases, a user may decide what portlets appear on a page and in other cases it is the developer of the page that decides which portlets or units of function are included in the page. As a typical example, a user may customize a portal page to include a search engine portlet, a stock price portlet, a weather portlet, and a sports scores portlet. However, more application specific examples may also exist. For example, a portal page may provide monitoring services for network resources, where each portlet presents a particular monitor.

The Web page is associated with a session identifier. If an information update that affects the Web page occurs, an update notification is associated with the session identifier. Periodically, the function in the Web page sends a session identifier to the refresh control helper. The portal server checks a data store to determine if update notifications associated with the session identifier have been received. If no update is available for the session identifier, the Web page is not refreshed. However, if updates are available for the page, the portal server removes any update notifications for the session identifier from the data store and informs the function in the Web page that new data is available. The function then requests a page reload.

Figure 4:
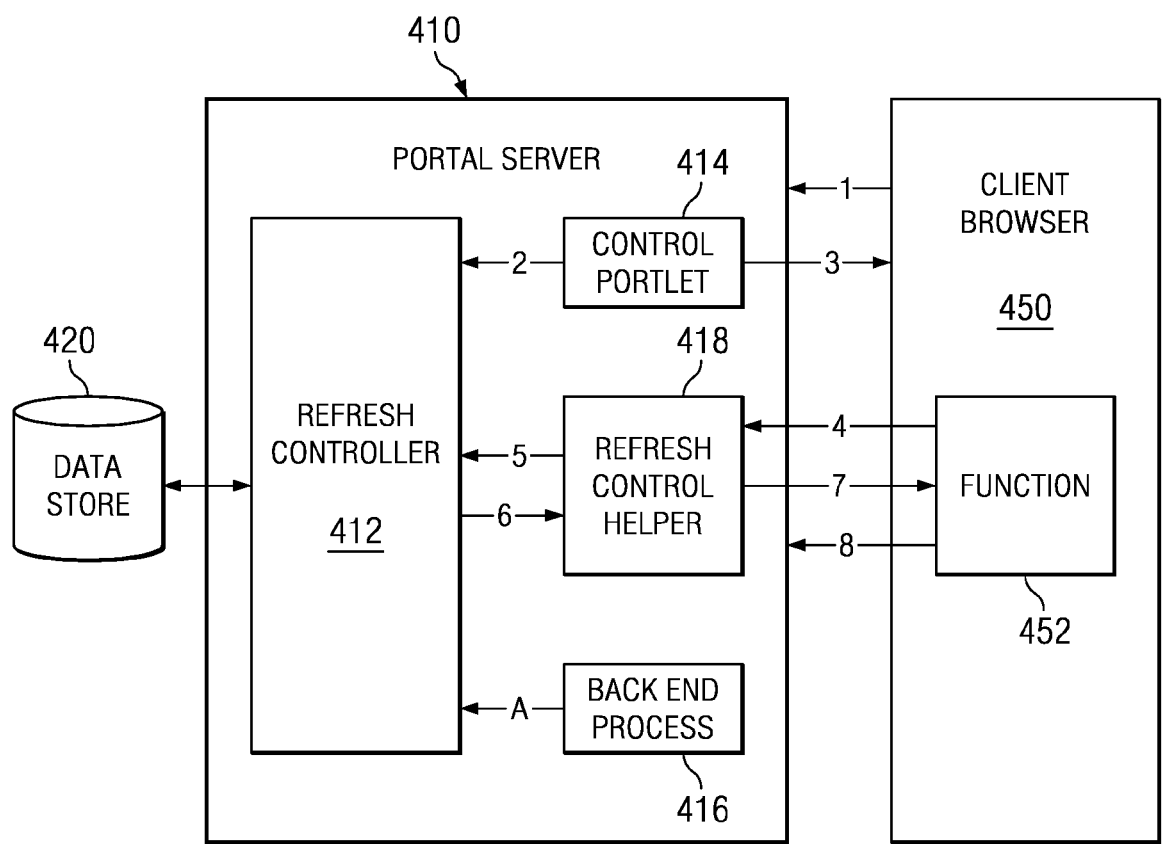
FIG. 4 is a block diagram illustrating a portal server communicating with a client browser in accordance with an exemplary embodiment of the present invention.

FIG. 4 is a block diagram illustrating a portal server communicating with a client browser in accordance with an exemplary embodiment of the present invention. Portal server 410 provides content to client software, such as client browser 450. Portal server may be a Web server, such as, for example, server 104 in FIG. 1. Client browser 450 may be embodied on a data processing system, such as client 108 in FIG. 1, for example.

Portal server 410 includes refresh controller 412 that store state information for registered HyperText Transfer Protocol (HTTP) sessions. Every portal page that may require timely updates will include a new control portlet, represented by control portlet 414 in portal server 410. In operation 1, client browser 450 requests a portal page from portal server 410. When a request is received, control portlet 414 registers (operation 2) a HTTP session identifier (ID) for the request with refresh controller 412 so that page reloads can be targeted to an individual browser session. Control portlet 414 also adds function 452, that may be a JavaScript function, to the requested page before the page is returned to client browser 450 (operation 3).

When the portal page is received at client browser 450, the page is rendered and function 452 is executed in client browser 450. The function may, for example, include a countdown timer. In operation 4, when the countdown timer counts down to zero, function 452 calls refresh control helper 418 to determine if a page reload is required. Refresh control helper 418 may be a servlet that runs on portal server 410. Function 452 passes the session ID to refresh control helper 418. In operation 5, refresh control helper 418 then calls refresh controller 412 and passes the session ID for the browser session corresponding to the portal page.

Back end process 416 determines whether new data is available for a particular HTTP session identifier. This determination may be made using various techniques within the scope of the present invention. Back end process 416 may identify which content corresponds to which portlets and determine whether new information is available for a given portlet. For example, some portal pages may include a particular monitor portlet. Thus, in this example, any HTTP session associated with a portal page with that monitor portlet would be affected by changes in status information for a particular network resource, for instance. However, other mechanisms for determining whether updates are available for a particular HTTP session may be used, depending upon the implementation, within the scope of the present invention.

When new data is available for a given HTTP session ID, an update notification event may be generated by back end process 416 and communicated to refresh controller 412, such as, for example, through a Java method call. Refresh controller 412 may then store the update notification events in data store 420. When refresh control helper 418 makes a call to refresh controller 412 in operation 5, refresh controller 412 then checks data store 420 to determine if any update notification events are associated with the session ID. In operation 6, refresh controller 412 informs refresh control helper 418 whether updates are available for the HTTP session ID. Refresh controller 412 also removes notifications for that session ID, if any, from data store 420.

Refresh control helper servlet 418 then informs function 452 whether new data is available in operation 7. If new data is available, function 452 requests a page reload from portal server 410 (operation 8) and the process restarts at operation 2. If new data is not available, function 452 restarts the countdown timer and the process restarts at operation 4 when the countdown timer expires.

Thus, the portal server of the present invention allows a back end process running on the portal server to provide notification events that cause a refresh for a particular browser session. The present invention allows timely updated data to be displayed on a user's browser, eliminating page reloads that are unnecessary when no data updates exist. This, in turn, reduces server load and frees network bandwidth by only reloading a page when new data is available. At the same time, the present invention provides updated data to the end user without any interaction from the user.

Figure 5:
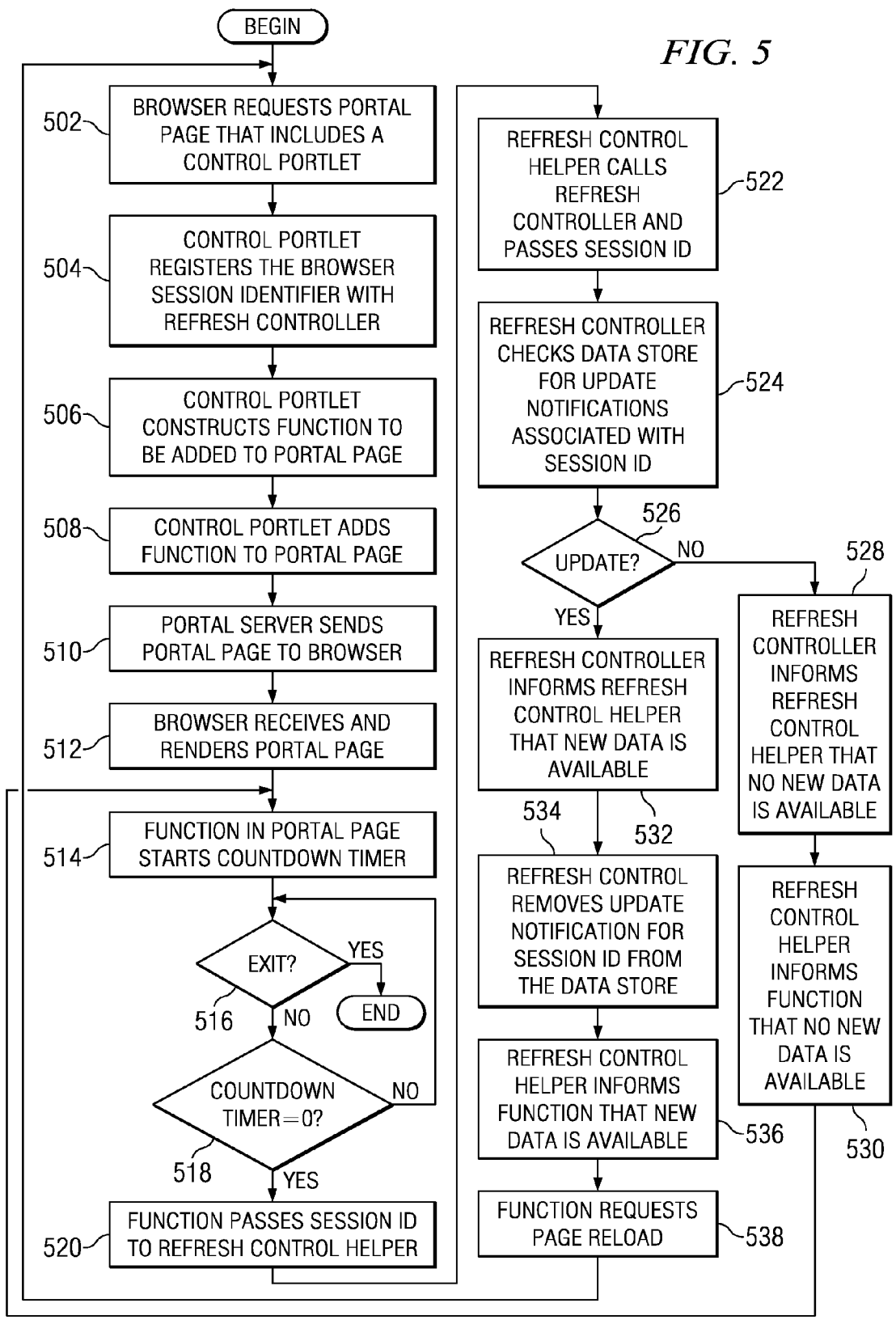
FIG. 5 is a flowchart illustrating the operation of a portal server environment in accordance with an exemplary embodiment of the present invention.

FIG. 5 is a flowchart illustrating the operation of a portal server environment in accordance with an exemplary embodiment of the present invention. The process begins and the client browser requests a portal page that includes a control portlet (block 502). Then, the control portlet registers the browser session identifier with a refresh controller (block 504). The control portlet constructs a function to be added to the portal page (block 506) and adds the function to the portal page (block 508).

Next, the portal server sends the portal page to the browser (block 510). The browser receives and renders the portal page (block 512) and the function in the portal page starts a countdown timer (block 514). A determination is made as to whether an exit condition exists (block 516). An exit condition may exist, for example without limitation, when the browser is closed or when a new page is loaded in the browser, thus ending the session. If an exit condition exists, the process ends. If an exit condition does not exist in block 516, a determination is made as to whether the countdown timer is down to zero (block 518). If the countdown timer is not expired, the process returns to block 516 to determine whether an exit condition exists.

If the countdown timer is down to zero in block 518, the function passes the session ID to a refresh control helper in the portal server (block 520). The refresh control helper then calls the refresh controller and passes the session ID to the refresh controller (block 522). The refresh controller then checks a data store for update notifications associated with the session ID (block 524) and a determination is made as to whether an update exists for the session ID (block 526).

If an update does not exist for the session ID, the refresh controller informs the refresh control helper that no new data is available (block 528) and the refresh control helper informs the function that no new data is available (block 530). Then, the process returns to block 514 and the function in the portal page restarts the countdown timer.

If an update exists for the session ID in block 526, the refresh controller informs the refresh control helper that new data is available (block 532) and removes any update notifications for the session ID from the data store (block 534). The refresh control helper then informs the function in the portal page that new data is available (block 536). In response to new data being available, the function in the portal page requests a page reload (block 538) and the process returns to block 502 and the function re-request the page from the server.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for timely update of a Web page, the method comprising:
    receiving a session identifier from a client, wherein the client requests a Web page and the session identifier is associated with the Web page;
    responsive to receiving the session identifier from the client, determining whether an update exists for the Web page associated with the session identifier;
    responsive to a determination that the update exists for the Web page associated with the session identifier, sending a notification to the client that the update exists, wherein the client requests a page refresh responsive to the notification
    responsive to sending the notification to the client that the update exists, receiving the request for the page refresh of the Web page including the update from the client; and
    responsive to receiving the request for the page refresh, sending the Web page including the update to the client.

2. The method of claim 1, further comprising:
    responsive to a determination that no updates exist for the Web page associated with the session identifier, sending a notification to the client that no updates exist.

3. The method of claim 1, wherein the Web page includes a refresh function that calls a refresh control helper.

4. The method of claim 3, wherein the refresh function calls the refresh control helper responsive to expiration of a timer.

5. The method of claim 3, wherein determining whether an update exists for the Web page associated with the session identifier is performed responsive to the function calling the refresh control helper.

6. The method of claim 1, further comprising:
    receiving update events from a back end process; and
    storing the update events in a data store.

7. The method of claim 6, wherein determining whether an update exists for the Web page associated with the session identifier includes determining whether at least one update event in the data store corresponds to the Web page associated with the session identifier.

8. The method of claim 7, wherein the Web page includes a set of portlets and wherein determining whether at least one update event in the data store corresponds to the session identifier includes determining whether at least one update event in the data store corresponds to a portlet within the set of portlets.

9. The method of claim 7, further comprising:
    responsive to a determination that an update exists for the Web page associated with the session identifier, deleting any update events corresponding to the session identifier from the data store.

10. The method of claim 1, wherein the Web page includes a set of portlets and wherein determining whether an update exists for the Web page associated with the session identifier includes determining whether an update exists for a portlet within the set of portlets.

11. An apparatus for timely update of a Web page, the apparatus comprising:
    a control portlet that receives a session identifier from a client and associates a Web page requested by the client with the session identifier;
    a refresh controller that, responsive to receiving the session identifier from the client, determines whether an update exists for the Web page associated with the session identifier, that, responsive to a determination that the update exists for the Web page associated with the session identifier, sends a notification to the client that the update exists, that, responsive to sending the notification to the client that an update exists, receiving the request for the page refresh of the Web page including the update from the client, and that, responsive to receiving the request for the page refresh, sending the Web page including the update to the client;
    wherein the client requests a page refresh responsive to the notification.

12. The apparatus of claim 11, wherein the refresh controller, responsive to a determination that no updates exist for the Web page associated with the session identifier, sends a notification to the client that no updates exist.

13. The apparatus of claim 11, further comprising:
    a refresh control helper, wherein control portlet includes in the Web page a refresh function that calls the refresh control helper and wherein the refresh control helper calls the refresh controller responsive to the refresh function calling the refresh control helper.

14. The apparatus of claim 13, wherein the refresh function calls the refresh control helper responsive to expiration of a timer.

15. The apparatus of claim 13, wherein the refresh controller determines whether an update exists for the Web page associated with the session identifier responsive to the refresh control helper calling the refresh controller.

16. The apparatus of claim 11, further comprising:
- a back end process that sends update events to the refresh controller;
- a data store, wherein the refresh controller stores the update events in the data store.

17. The apparatus of claim 16, wherein the refresh controller determines whether an update exists for the Web page associated with the session identifier by determining whether at least one update event in the data store corresponds to the Web page.

18. The apparatus of claim 17, wherein the refresh controller, responsive to a determination that an update exists for the Web page associated with the session identifier, deletes any update events corresponding to the session identifier from the data store.

19. The apparatus of claim 11, wherein the Web page includes a set of portlets and wherein the refresh controller determines whether an update exists for the session identifier by determining whether an update exists for a portlet within the set of portlets.

20. A tangible computer storage medium having a computer program product, encoded thereon for timely update of a Web page, the computer program product comprising:
- instructions for receiving a session identifier from a client, wherein the client requests a Web page and the session identifier is associated with the Web page;
- instructions for determining whether an update exists for the Web page associated with the session identifier;
- instructions, responsive to a determination that the update exists for the Web page associated with the session identifier, for sending a notification to the client that the update exists, wherein the client requests a page refresh responsive to the notification
- instructions, responsive to sending the notification to the client that the update exists, for receiving the request for the page refresh of the Web page including the update from the client; and
- instructions, responsive to receiving the request for the page refresh, for sending the Web page including the update to the client.

* * * * *